US011081130B1

(12) United States Patent
Chawalitsittikul et al.

(10) Patent No.: US 11,081,130 B1
(45) Date of Patent: *Aug. 3, 2021

(54) SUSPENSION STANDOFF ARRANGEMENT FOR CONFINING ADHESIVE

(71) Applicant: Western Digital Technologies, Inc., San Jose, CA (US)

(72) Inventors: Pongsatorn Chawalitsittikul, Pathumthani (TH); Anucha Suvibua, Pathumthani (TH); Wanchai Sedklang, Pathumthani (TH)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,433

(22) Filed: Jan. 31, 2020

(51) Int. Cl.
    *G11B 5/48* (2006.01)
(52) U.S. Cl.
    CPC .................. *G11B 5/4826* (2013.01)
(58) Field of Classification Search
    None
    See application file for complete search history.

(56) References Cited

U.S. PATENT DOCUMENTS

| | | | |
|---|---|---|---|
| 5,880,908 A * | 3/1999 | Shiraishi | G11B 5/4826 360/234.6 |
| 5,907,452 A * | 5/1999 | Kan | G11B 5/4833 360/99.16 |
| 6,078,472 A | 6/2000 | Mitoh et al. | |
| 6,657,821 B1 | 12/2003 | Jenneke | |
| 7,545,605 B2 | 6/2009 | Hagiya et al. | |
| 7,729,089 B1 | 6/2010 | Hogan | |
| 7,995,310 B1 | 8/2011 | Pan | |
| 8,553,364 B1 | 10/2013 | Schreiber et al. | |
| 8,792,212 B1 | 7/2014 | Pan et al. | |
| 9,196,274 B2 | 11/2015 | Stephan et al. | |
| 9,311,938 B1 | 4/2016 | Ee et al. | |
| 9,558,768 B1 | 1/2017 | Tsuchiya et al. | |
| 2005/0157425 A1 | 7/2005 | Walter et al. | |
| 2006/0203389 A1 * | 9/2006 | Motonishi | G11B 5/4826 360/234.6 |
| 2006/0285249 A1 | 12/2006 | Hagiya et al. | |
| 2006/0285252 A1 | 12/2006 | Hagiya et al. | |

FOREIGN PATENT DOCUMENTS

| | | |
|---|---|---|
| CN | 1839428 | 9/2006 |
| JP | 2013020669 A * | 1/2013 |

OTHER PUBLICATIONS

English-machine translation of JP 2013-020669A to Miura et al., published on Jan. 31, 2013. (Year: 2013).*
U.S. Appl. No. 16/884,324, filed May 27, 2020.
Qian et al., "Crown Sensitivity of the Magnetic Recording Head Gimbal Assembly Bonded by a Viscoelastic Adhesive", Mechanics of Time-Dependent Materials, Dec. 1998.
International Search Report and Written Opinion dated Aug. 12, 2020 in International Patent Application No. PCT/US2020/035013.
Office Action dated Mar. 16, 2021 in U.S. Appl. No. 16/884,324.

* cited by examiner

*Primary Examiner* — William J Klimowicz
(74) *Attorney, Agent, or Firm* — Vierra Magen Marcus LLP

(57) ABSTRACT

A head gimbal assembly for a data storage device is provided. The head gimbal assembly includes a suspension, and a slider mounting point on the suspension. The slider mounting point includes an adhesive pocket bounded by a plurality of dielectric standoffs.

19 Claims, 19 Drawing Sheets

SUSPENSION STANDOFF ARRANGEMENT FOR CONFINING ADHESIVE

BACKGROUND

This disclosure relates to head assemblies used in data storage devices.

A hard-disk drive is a non-volatile storage device that is housed in a protective enclosure and stores digitally encoded data on one or more circular disks having magnetic surfaces. In operation, each magnetic-recording disk of a hard-disk drive is rapidly rotated by a spindle system. Data are read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

The read-write head is fabricated in a head slider, which is coupled with a suspension in a head gimbal assembly. An adhesive often is used to adhere the slider to the suspension. It is desirable to improve techniques for adhering the slider to the suspension.

BRIEF DESCRIPTION OF THE DRAWINGS

Like-numbered elements refer to common components in the different figures.

DETAILED DESCRIPTION

A head gimbal assembly is described for a data storage device. The head gimbal assembly includes a suspension, and a slider mounting point on the suspension. The slider mounting point includes an adhesive pocket bounded by multiple dielectric standoffs. The multiple dielectric standoffs are configured to limit a spread of multiple adhesive dots disposed in the adhesive pocket.

Figure 1:
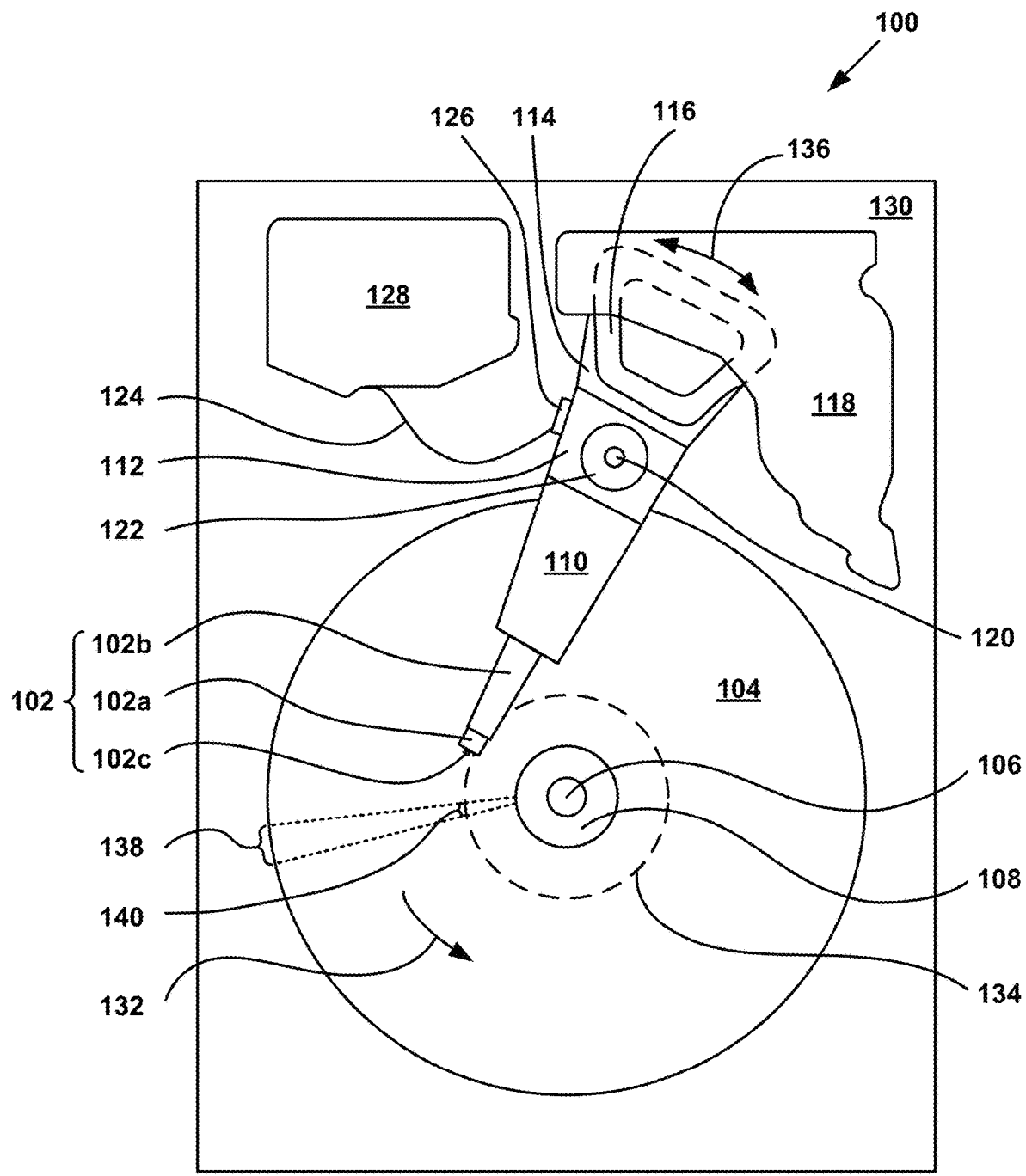
FIG. 1 is a plan view illustrating an embodiment of a hard disk drive.

Embodiments may be used in the context of a head gimbal assembly (HGA) for a hard disk drive (HDD). FIG. 1 illustrates a functional arrangement of components of an example HDD 100, which includes a HGA 102, a magnetic-recording medium 104 rotatably mounted on a spindle 106 and a drive motor (not visible) attached to spindle 106 for rotating magnetic-recording medium 104. Magnetic-recording medium 104 (or a plurality of disk media) may be affixed to spindle 106 with a disk clamp 108.

In an embodiment, HGA 102 includes a slider 102a mounted to a suspension 102b. A magnetic read-write head 102c is mounted to slider 102a. Magnetic read-write head 102c includes a write element (not shown) and a read element (not shown) for respectively writing and reading information stored on magnetic-recording medium 104.

HDD 100 further includes an arm 110 attached to HGA 102, a carriage 112, a voice-coil motor (VCM) that includes an armature 114 including a voice coil 116 attached to carriage 112 and a stator 118 including a voice-coil magnet (not visible). Armature 114 is attached to carriage 112, and is mounted on a pivot-shaft 120 with an interposed pivot bearing assembly 122. Armature 114 is configured to move arm 110 and HGA 102 to access portions of magnetic-recording medium 104. In the case of an HDD having multiple disks, carriage 112 is called an "E-block," or comb, because the carriage is arranged to carry a ganged array of arms that gives it the appearance of a comb.

Electrical signals (e.g., current to voice coil 116) comprising a write signal to and a read signal from magnetic read-write head 102c are provided by a flexible interconnect cable ("flex cable") 124. Interconnection between flex cable 124 and magnetic read-write head 102c may be provided by an arm-electronics (AE) module 126. In an embodiment, AE module 126 includes an on-board pre-amplifier for the read signal, as well as other read-channel and write-channel electronic components. AE module 126 may be attached to carriage 112 as shown.

In an embodiment, flex cable 124 is coupled to an electrical-connector block 128, which provides electrical communication through electrical feed-throughs provided by an HDD housing 130. HDD housing 130, also referred to as a base, in conjunction with an HDD cover (not shown) provides a sealed, protective enclosure for the information storage components of HDD 100.

Other electronic components (not shown), including a disk controller and servo electronics including a digital-signal processor (DSP), provide electrical signals to the drive motor, voice coil 116 and magnetic read-write head 102c. Electrical signals provided to the drive motor enables the drive motor to spin providing a torque to spindle 106 which is in turn transmitted to magnetic-recording medium 104. As a result, magnetic-recording medium 104 spins in a direction 132.

The spinning magnetic-recording medium 104 commonly creates a cushion of air that acts as an air-bearing on which the air-bearing surface (ABS) of slider 102a rides so that slider 102a flies above the surface of magnetic-recording medium 104 without making contact with a thin magnetic-recording layer in which information is recorded. Similarly in an HDD in which a lighter-than-air gas is utilized, such as helium or nitrogen for non-limiting examples, the spinning medium 104 creates a cushion of gas that acts as a gas or fluid bearing on which slider 102a rides.

Electrical signals provided to voice coil 116 enables magnetic read-write head 102c to access a track 134 on which information is recorded. Thus, armature 114 swings through an arc 136, which enables magnetic read-write head 102c to access various tracks on magnetic-recording medium 104. Information is stored on magnetic-recording medium 104 in a plurality of radially nested tracks arranged in sectors on magnetic-recording medium 104, such as sector 138. Correspondingly, each track is composed of a plurality of sectored track portions (or "track sector"), for example, track sector 140.

Each track sector 140 may be composed of recorded data and a header containing a servo-burst-signal pattern, for example, an ABCD-servo-burst-signal pattern, which is information that identifies track 134, and error correction code information. In accessing track 134, the read element of magnetic read-write head 102c reads the servo-burst-signal pattern which provides a position-error-signal (PES) to the servo electronics, which control the electrical signals provided to voice coil 116, enabling magnetic read-write head 102c to follow track 134. Upon finding track 134 and identifying a particular track sector 140, magnetic read-write head 102c either reads data from track 134 or writes data to track 134 depending on instructions received by the disk controller from an external agent, for example, a microprocessor of a computer system.

A HDD's electronic architecture includes numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 130.

References herein to a hard disk drive, such as HDD 100 illustrated and described in reference to FIG. 1, may encompass a data storage device that is at times referred to as a "hybrid drive." A hybrid drive refers generally to a storage device having functionality of both a traditional HDD (e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality.

A hybrid drive may be designed and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Figure 2A:
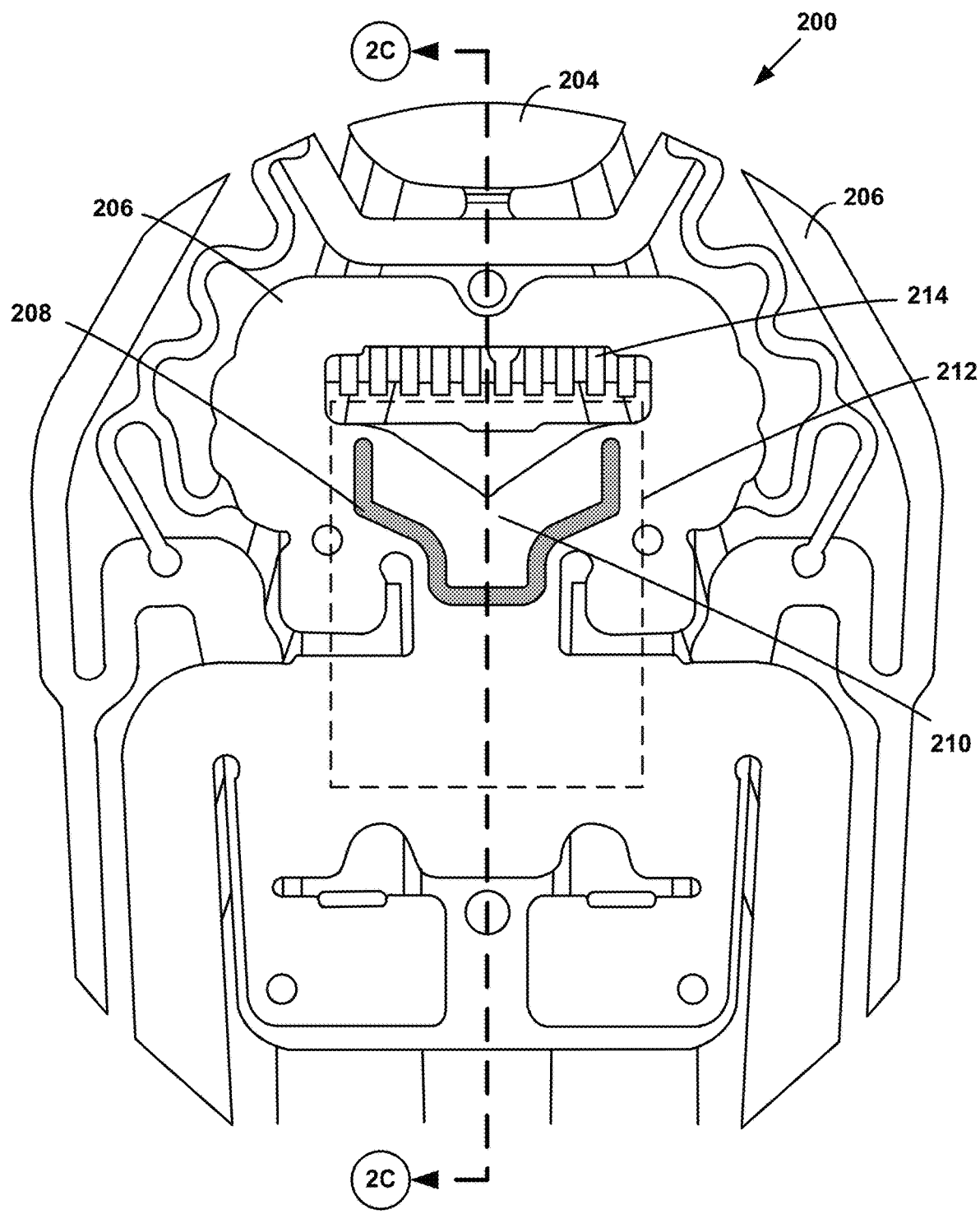
FIGS. 2A-2E depict various views of part of an embodiment of a head gimbal assembly.
Figure 2B:
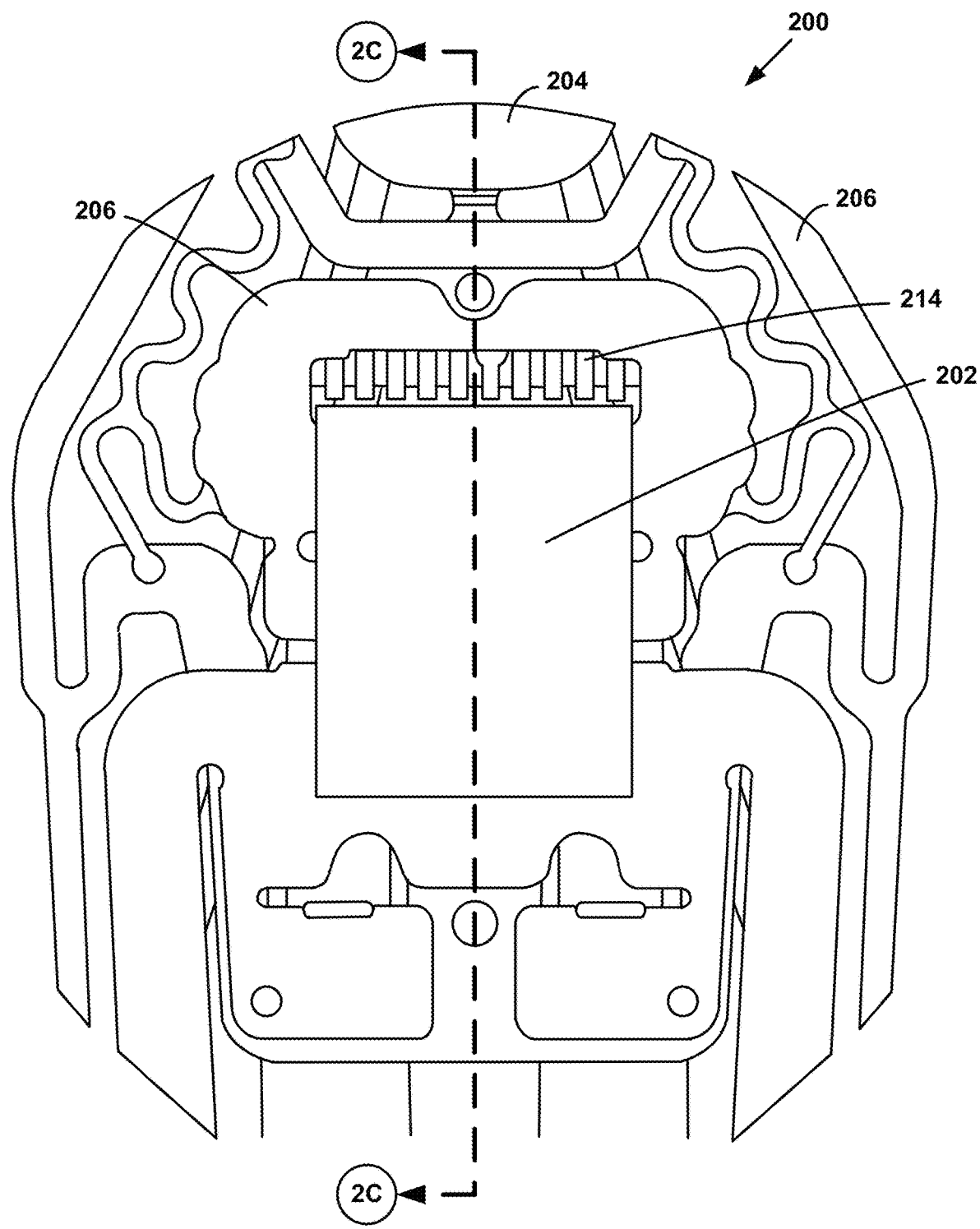
Figure 2C:
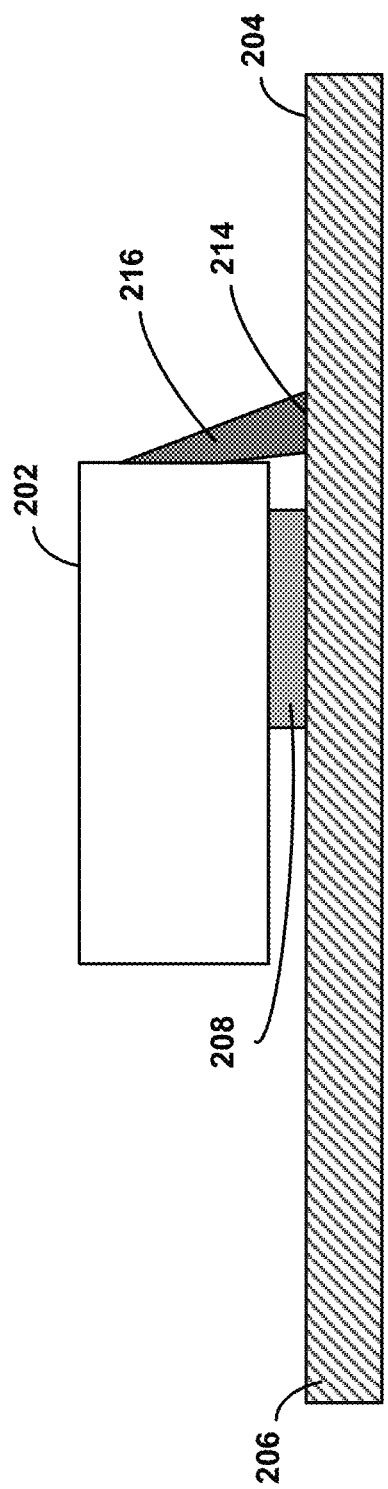

FIGS. 2A-2E depict various views of part of a HGA 200 that includes a slider 202 mounted to a suspension 204. Slider 202 is an embodiment of slider 102a of FIG. 1, and suspension 204 is an embodiment of suspension 102b of FIG. 1. FIG. 2A is a top view of HGA 200, with slider 202 shown only in outline to reveal features below slider 202. FIG. 2B is a top view of HGA 200, with slider 202 attached to suspension 204. FIG. 2C is a side view of HGA 200.

In an embodiment, suspension 204 includes a stainless steel layer 206, which provides structural support for HGA 200. A first dielectric standoff 208 is disposed on stainless steel layer 206, and provides electrical isolation for additional elements (not shown) of HGA 200. In an embodiment, first dielectric standoff 208 is polyimide, although other material may be used. For simplicity, first dielectric standoff 208 will be referred to in the remaining description as "first polyimide standoff 208."

First polyimide standoff 208 also partially bounds adhesive pocket 210, and provides height control for slider 202. Adhesive pocket 210 contains an adhesive (not shown in FIGS. 2A-2C, but described below with reference to FIGS. 2D-2E), such as epoxy, which bonds slider 202 to suspension 204. The region on stainless steel layer 206 directly beneath slider 202 is referred to as a slider mounting point 212, which is represented by the dashed-line rectangle in FIG. 2A. Slider mounting point 212 includes adhesive pocket 210 and first polyimide standoff 208. Contact pad 214 is connected to the read/write element contacts of slider 202 by solder 216. In an embodiment, contact pad 214 is made of gold-plated copper.

In an embodiment, first polyimide standoff 208 has a thickness (height) of between about 5 μm and about 10 μm, and a width of between about 50 μm and about 70 μm, although other thicknesses and widths may be used. In an embodiment, first polyimide standoff 208 has a generally V-type shape, although other shapes may be used.

Figure 2D:
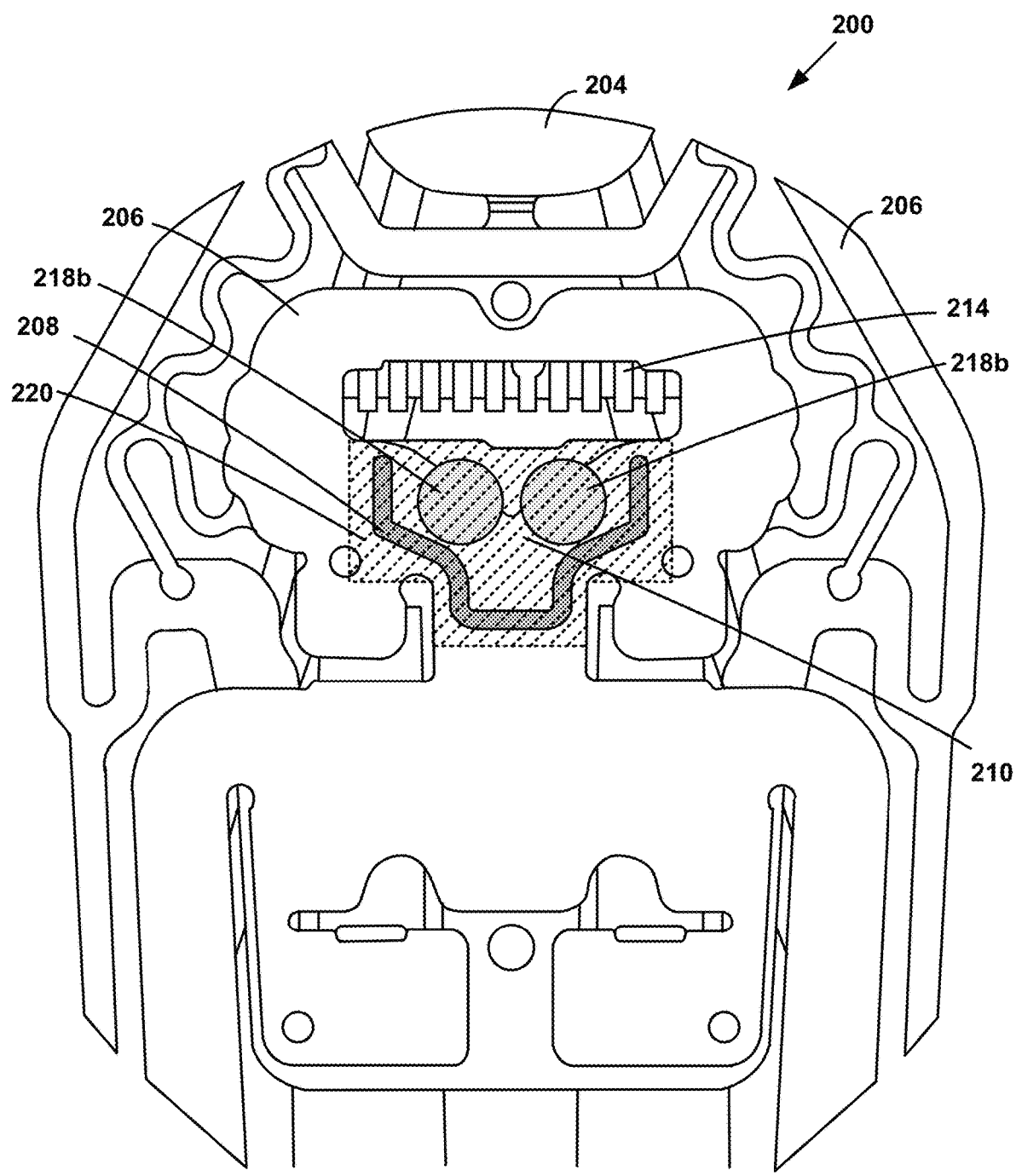

FIG. 2D illustrates multiple adhesive dots disposed on stainless steel layer 206 in adhesive pocket 210 prior to depositing slider 202 on stainless steel layer 206. In an embodiment, two adhesive dots 218a and 218b are disposed on stainless steel layer 206 in adhesive pocket 210, although more than two adhesive dots may be used. In an embodiment, adhesive dots 218a and 218b are substantially circular in shape, although other dot shapes (e.g., elliptical, rectangular, polygonal) may be used.

After slider 202 is deposited on stainless steel layer 206, adhesive dots 218a and 218b tend to spread, due to the viscosity of the adhesive. A region 220 (shown in cross-hatch) of stainless steel layer 206 depicts the permissible area in which adhesive dots 218a and 218b may spread after slider 202 is deposited on stainless steel layer 206. Region 220, also referred to herein as "permissible adhesive spread region 220" defines the outer limits of the region of stainless steel layer 206 in which adhesive may spread without causing damage to components of HGA 200. In other words, it is desirable to limit or confine the spread of adhesive dots 218a and 218b to permissible adhesive spread region 220.

In an embodiment, first polyimide standoff 208 has a shape designed to limit or confine the spread of adhesive dots 218a and 218b to permissible adhesive spread region 220. In an embodiment, first polyimide standoff 208 has a shape that generally conforms to the shape of permissible adhesive spread region 220.

Figure 2E:
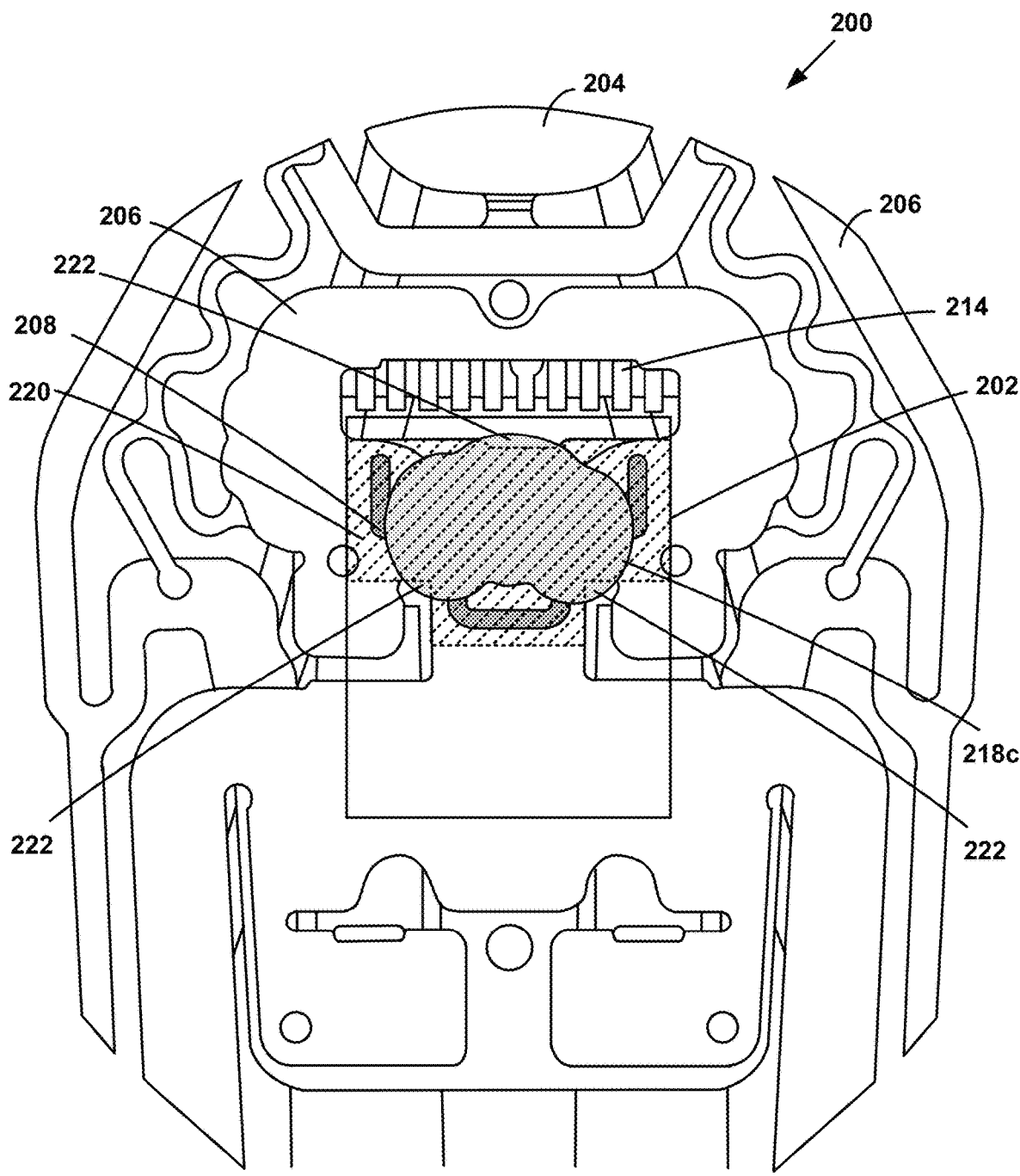

However, FIG. 2E illustrates an example spread of adhesive dots 218a and 218b after slider 202 (shown only in outline in FIG. 2E) is deposited on stainless steel layer 206. In an embodiment, adhesive dots 218a and 218b merge and spread to form a merged adhesive shape 218c that includes multiple portions 222 that extend beyond the boundaries of permissible adhesive spread region 220. Thus, although first polyimide standoff 208 confined portions of merged adhesive shape 218c to permissible adhesive spread region 220, first polyimide standoff 208 may not be effective to entirely confine merged adhesive shape 218c within the boundaries of permissible adhesive spread region 220.

Figure 3A:
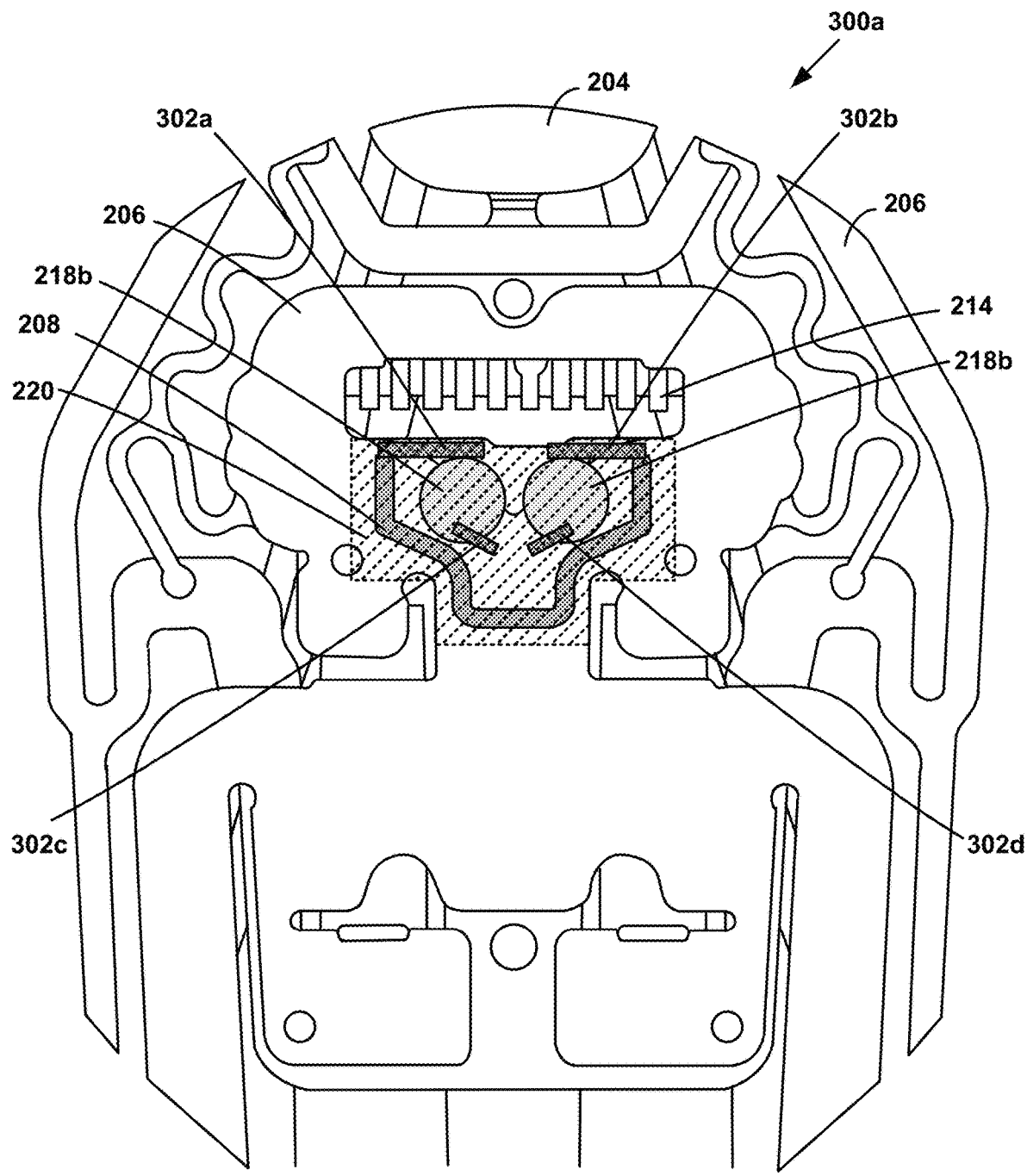
FIGS. 3A-3M depict various views of part of an embodiment of a head gimbal assembly.
Figure 3B:
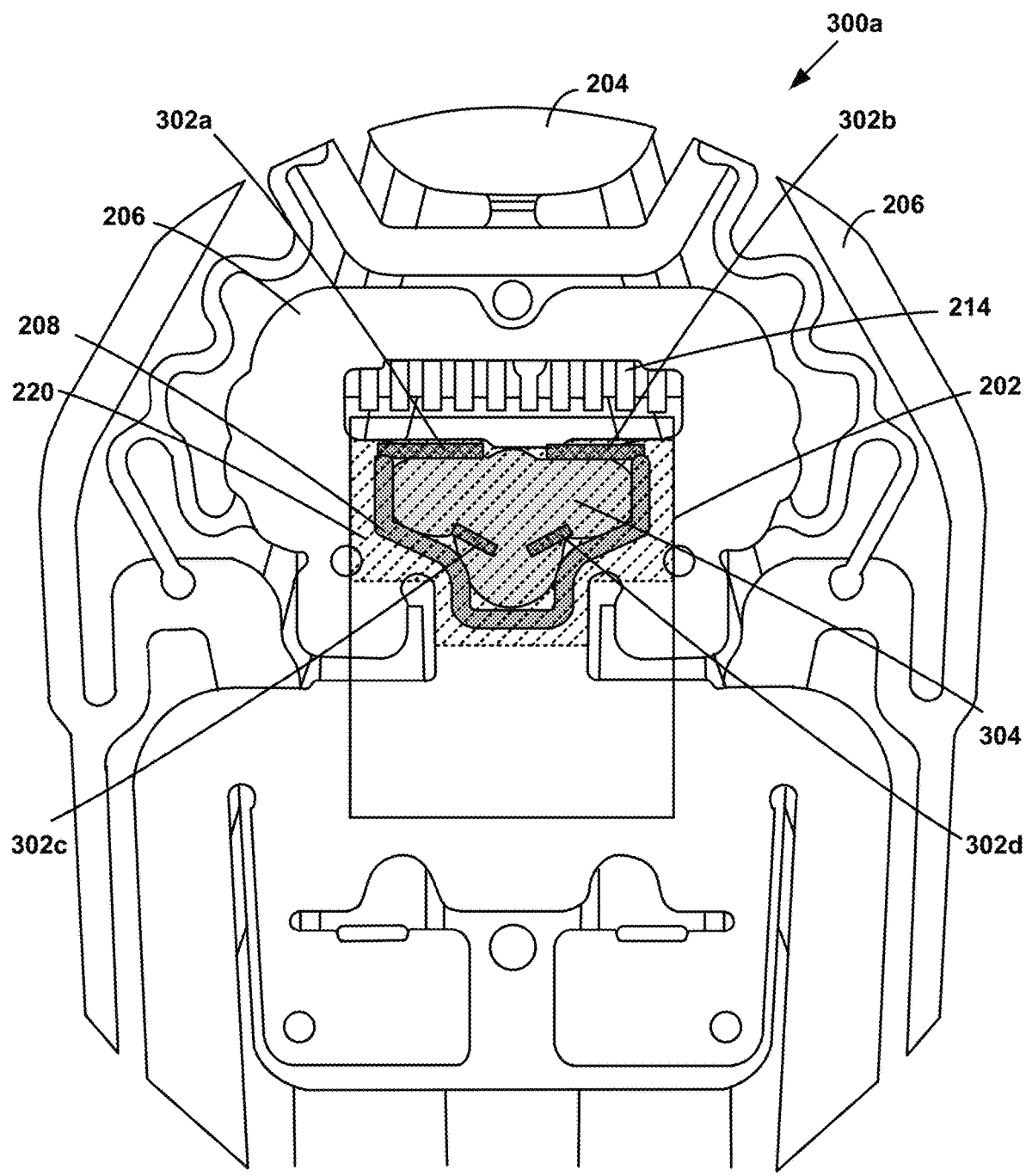

FIGS. 3A-3B depict top views of part of an embodiment of an HGA 300a that includes a slider 202 mounted to a suspension 204. FIG. 3A is a top view of HGA 300a before slider 202 is attached to suspension 204, and FIG. 3B is a top view of HGA 300a, with slider 202 attached to suspension 204.

HGA 300a is similar to HGA 200 of FIGS. 2A-2E, and includes first polyimide standoff 208. HGA 300a also includes additional polyimide standoffs 302a-302d. In particular, a second polyimide standoff 302a and a third polyimide standoff 302b are disposed near an upper perimeter of permissible adhesive spread region 220, and a fourth polyimide standoff 302c and a fifth polyimide standoff 302d are disposed in a central region of permissible adhesive spread region 220.

In an embodiment, second polyimide standoff 302a, third polyimide standoff 302b, fourth polyimide standoff 302c and fifth polyimide standoff 302d each have a thickness (height) of between about 5 μm and about 10 μm, and a width of between about 50 µm and about 70 µm, although other thicknesses and widths may be used. In an embodiment, second polyimide standoff 302a, third polyimide standoff 302b, fourth polyimide standoff 302c and fifth polyimide standoff 302d each have a generally rectangular shape, although other shapes may be used.

In an embodiment, second polyimide standoff 302a and third polyimide standoff 302b extend in a direction substantially parallel to the upper perimeter of permissible adhesive spread region 220. In an embodiment, fourth polyimide standoff 302c and fifth polyimide standoff 302d are disposed at an angle (e.g., positive and negative 45 degrees, respectively) relative to the orientation of second polyimide standoff 302a and third polyimide standoff 302b, as depicted in FIG. 3A.

In an embodiment, second polyimide standoff 302a and third polyimide standoff 302b may be formed as distinct features, independent of first polyimide standoff 208, or may be formed as a unitary feature with first polyimide standoff 208. In an embodiment, fourth polyimide standoff 302c and fifth polyimide standoff 302d are formed as distinct features, independent of one another, and of first polyimide standoff 208, second polyimide standoff 302a and third polyimide standoff 302b.

FIG. 3B illustrates an example spread of adhesive dots 218a and 218b after slider 202 (shown only in outline in FIG. 3B) is deposited on stainless steel layer 206. In an embodiment, adhesive dots 218a and 218b merge and spread to form a merged adhesive shape 304. Without wanting to be bound by any particular theory, it is believed that first polyimide standoff 208, second polyimide standoff 302a, third polyimide standoff 302b, fourth polyimide standoff 302c and fifth polyimide standoff 302d of FIGS. 3A-3B may confine merged adhesive shape 304 within the boundaries of permissible adhesive spread region 220.

Figure 3C:
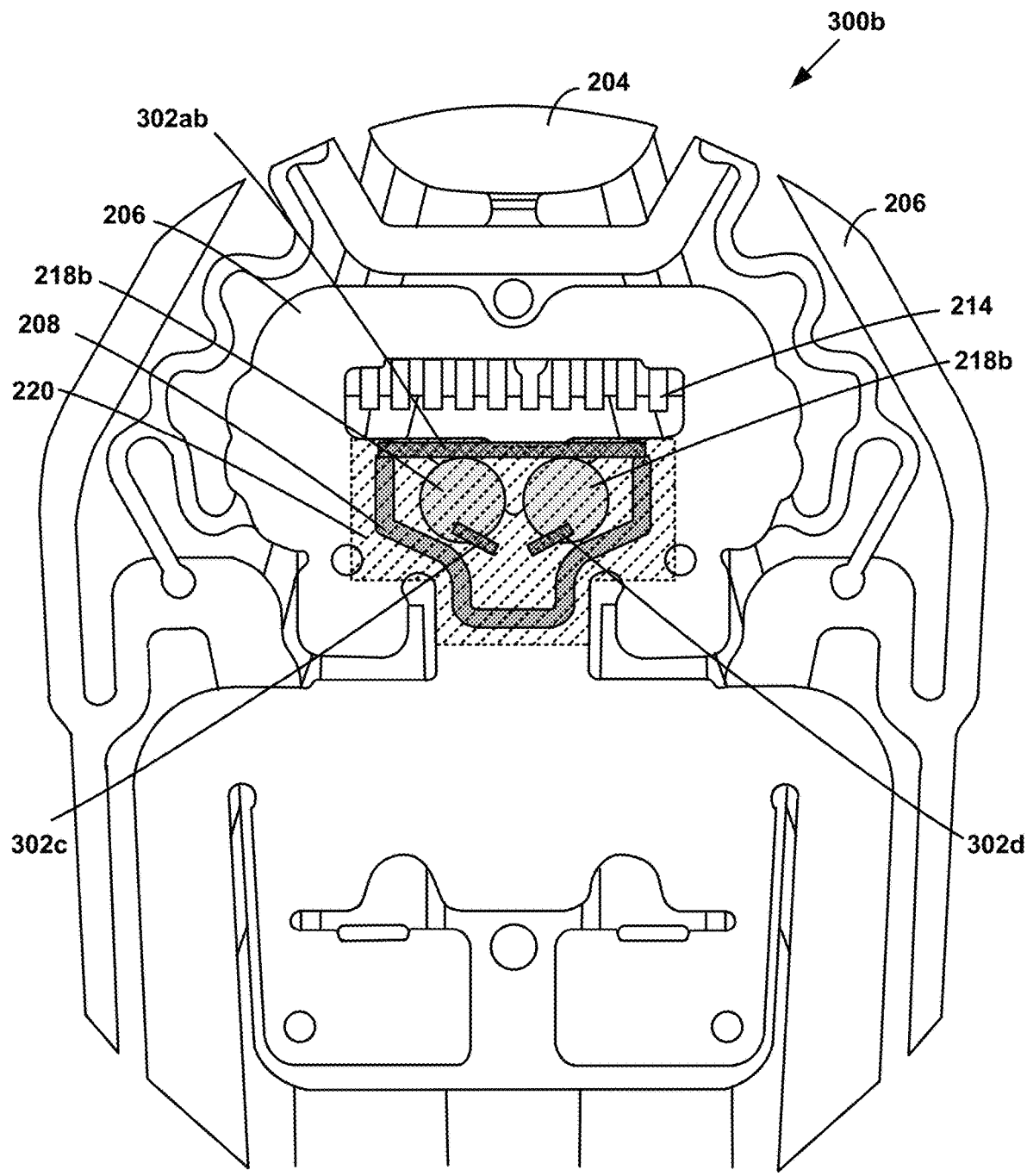

FIG. 3C depicts a top view of part of an embodiment of an HGA 300b before slider 202 is attached to suspension 204. HGA 300b is similar to HGA 300a of FIGS. 3A-3B, but includes a sixth polyimide standoff 302ab (instead of second polyimide standoff 302a and third polyimide standoff 302b) that is disposed near an upper perimeter of permissible adhesive spread region 220. In an embodiment, sixth polyimide standoff 302ab extends in a direction substantially parallel to the upper perimeter of permissible adhesive spread region 220.

In an embodiment, sixth polyimide standoff 302ab has a thickness (height) of between about 5 µm and about 10 µm, and a width of between about 50 µm and about 70 µm, although other thicknesses and widths may be used. In an embodiment, sixth polyimide standoff 302ab has a generally rectangular shape, although other shapes may be used.

In an embodiment, sixth polyimide standoff 302ab may be formed as a distinct feature, independent of first polyimide standoff 208, or may be formed as a unitary feature with first polyimide standoff 208. In an embodiment, fourth polyimide standoff 302c and fifth polyimide standoff 302d are formed as distinct features, independent of one another, and of first polyimide standoff 208, and sixth polyimide standoff 302ab.

Without wanting to be bound by any particular theory, it is believed that first polyimide standoff 208, fourth polyimide standoff 302c, fifth polyimide standoff 302d and sixth polyimide standoff 302ab of FIG. 3C may confine a merged adhesive shape (e.g., a merger of adhesive dots 218a and 218b) within the boundaries of permissible adhesive spread region 220.

Figure 3D:
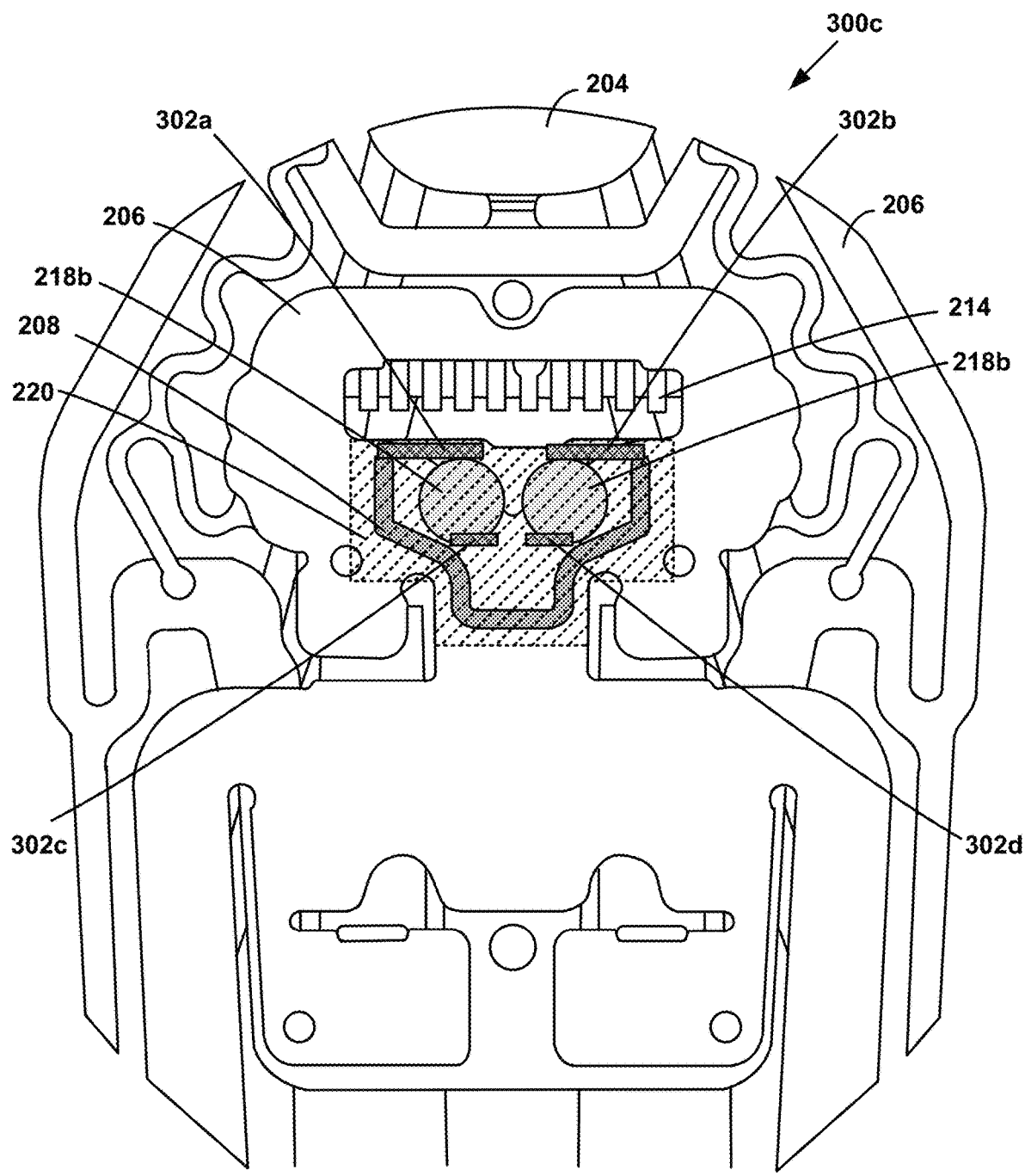

FIG. 3D depicts a top view of part of an embodiment of an HGA 300c before slider 202 is attached to suspension 204. HGA 300c is similar to HGA 300a of FIGS. 3A-3B, but fourth polyimide standoff 302c and fifth polyimide standoff 302d are disposed substantially parallel to the orientation of second polyimide standoff 302a and third polyimide standoff 302b. Without wanting to be bound by any particular theory, it is believed that first polyimide standoff 208, second polyimide standoff 302a, third polyimide standoff 302b, fourth polyimide standoff 302c and fifth polyimide standoff 302d of FIG. 3D may confine a merged adhesive shape (e.g., a merger of adhesive dots 218a and 218b) within the boundaries of permissible adhesive spread region 220.

Figure 3E:
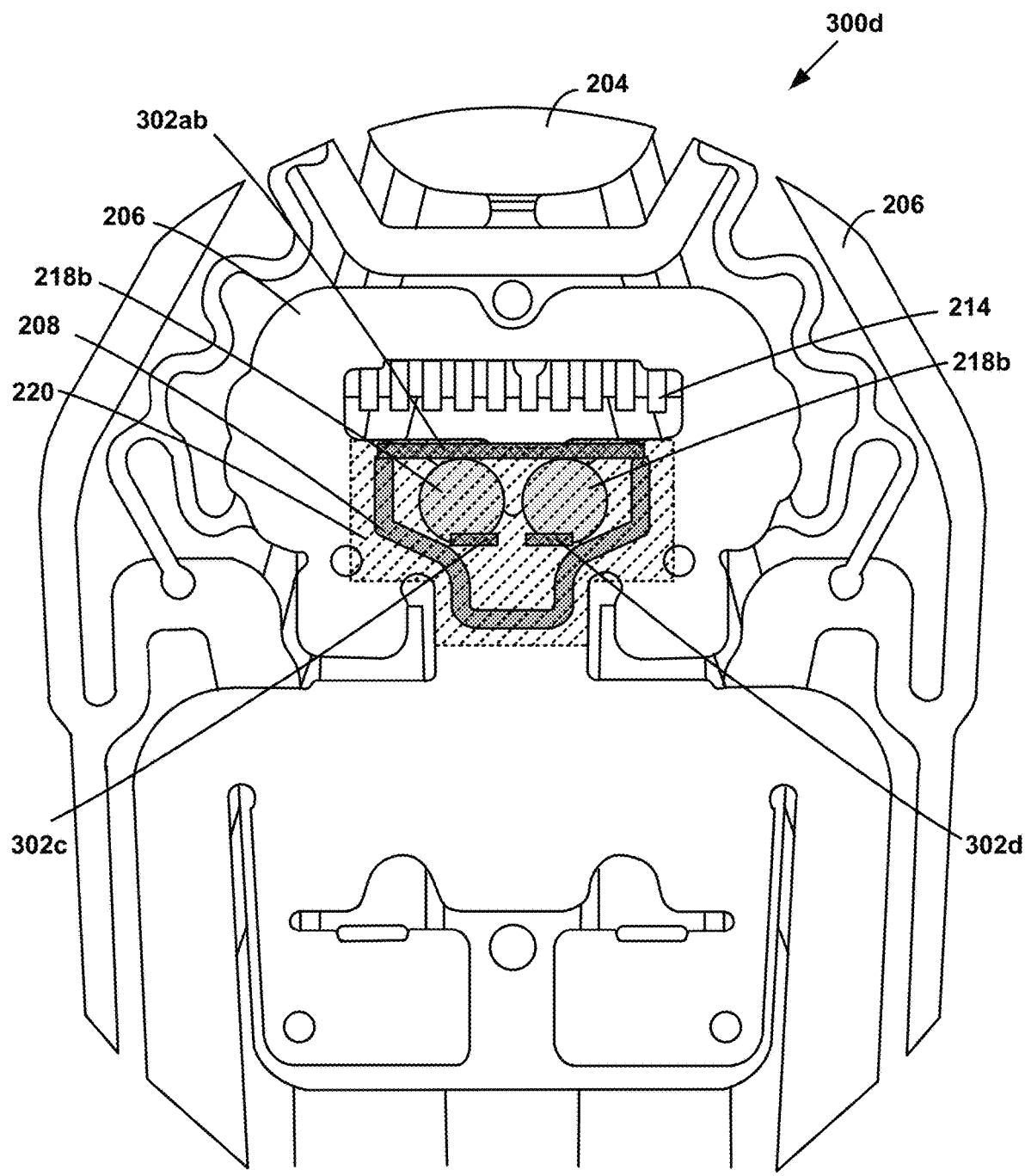

FIG. 3E depicts a top view of part of an embodiment of an HGA 300d before slider 202 is attached to suspension 204. HGA 300d is similar to HGA 300c of FIG. 3D, but includes sixth polyimide standoff 302ab (instead of second polyimide standoff 302a and third polyimide standoff 302b) that is disposed near an upper perimeter of permissible adhesive spread region 220. Without wanting to be bound by any particular theory, it is believed that first polyimide standoff 208, fourth polyimide standoff 302c, fifth polyimide standoff 302d and sixth polyimide standoff 302ab of FIG. 3E may confine a merged adhesive shape (e.g., a merger of adhesive dots 218a and 218b) within the boundaries of permissible adhesive spread region 220.

Figure 3F:
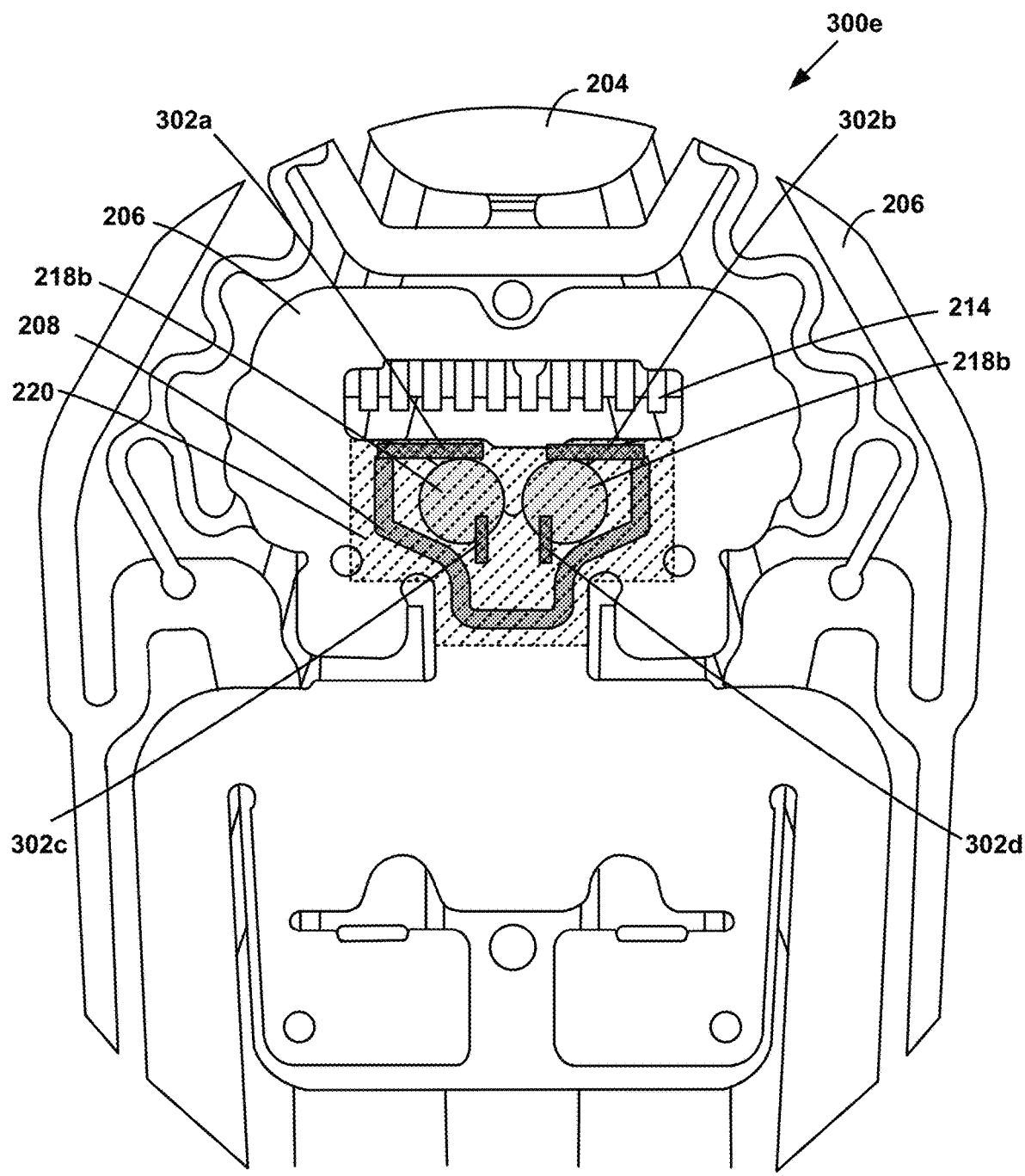

FIG. 3F depicts a top view of part of an embodiment of an HGA 300e before slider 202 is attached to suspension 204. HGA 300e is similar to HGA 300c of FIG. 3D, but fourth polyimide standoff 302c and fifth polyimide standoff 302d are disposed substantially perpendicular to the orientation of second polyimide standoff 302a and third polyimide standoff 302b. Without wanting to be bound by any particular theory, it is believed that first polyimide standoff 208, second polyimide standoff 302a, third polyimide standoff 302b, fourth polyimide standoff 302c and fifth polyimide standoff 302d of FIG. 3F may confine a merged adhesive shape (e.g., a merger of adhesive dots 218a and 218b) within the boundaries of permissible adhesive spread region 220.

Figure 3G:
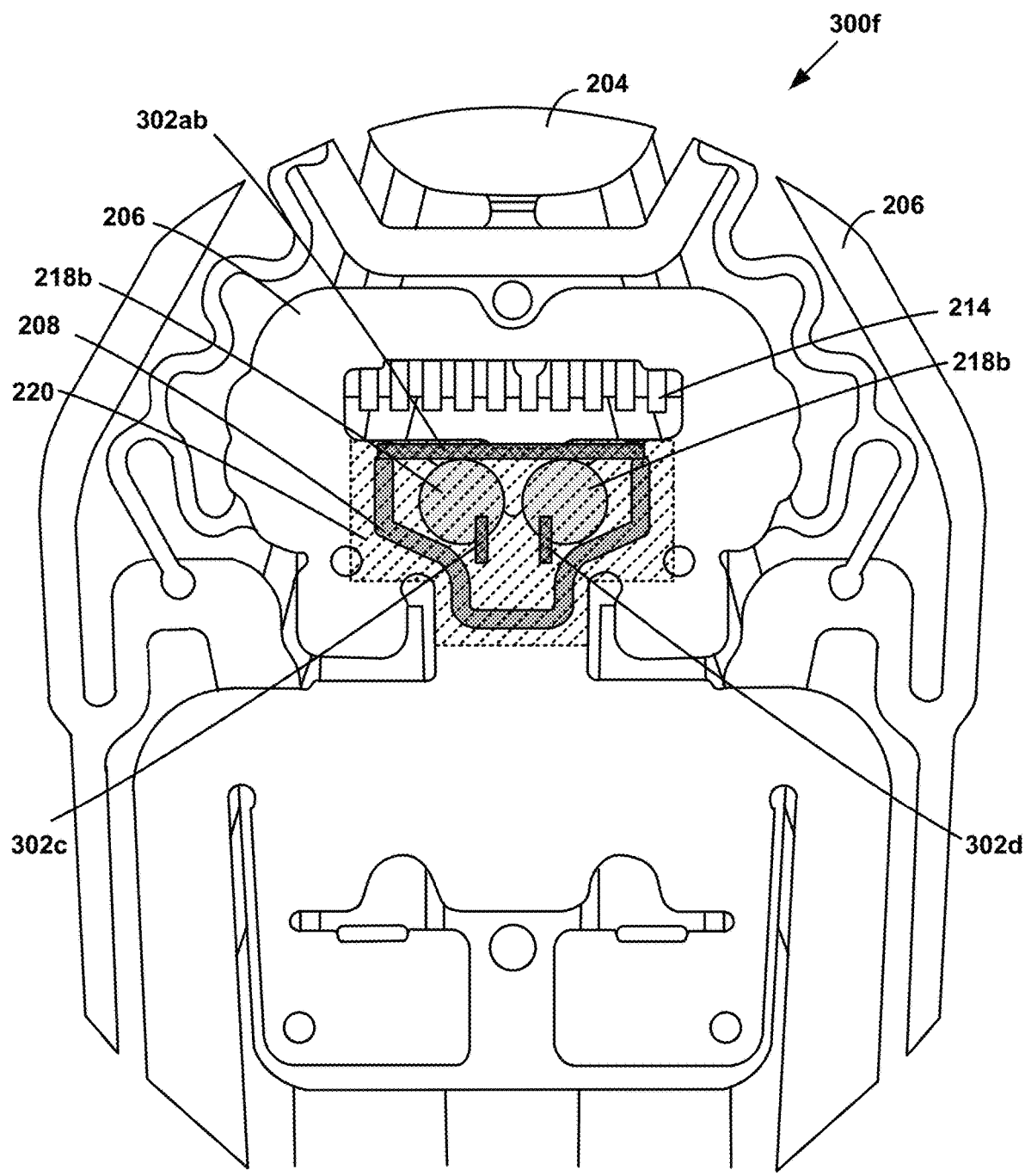

FIG. 3G depicts a top view of part of an embodiment of an HGA 300f before slider 202 is attached to suspension 204. HGA 300f is similar to HGA 300e of FIG. 3F, but includes sixth polyimide standoff 302ab (instead of second polyimide standoff 302a and third polyimide standoff 302b) that is disposed near an upper perimeter of permissible adhesive spread region 220. Without wanting to be bound by any particular theory, it is believed that first polyimide standoff 208, fourth polyimide standoff 302c, fifth polyimide standoff 302d and sixth polyimide standoff 302ab of FIG. 3G may confine a merged adhesive shape (e.g., a merger of adhesive dots 218a and 218b) within the boundaries of permissible adhesive spread region 220.

Figure 3H:
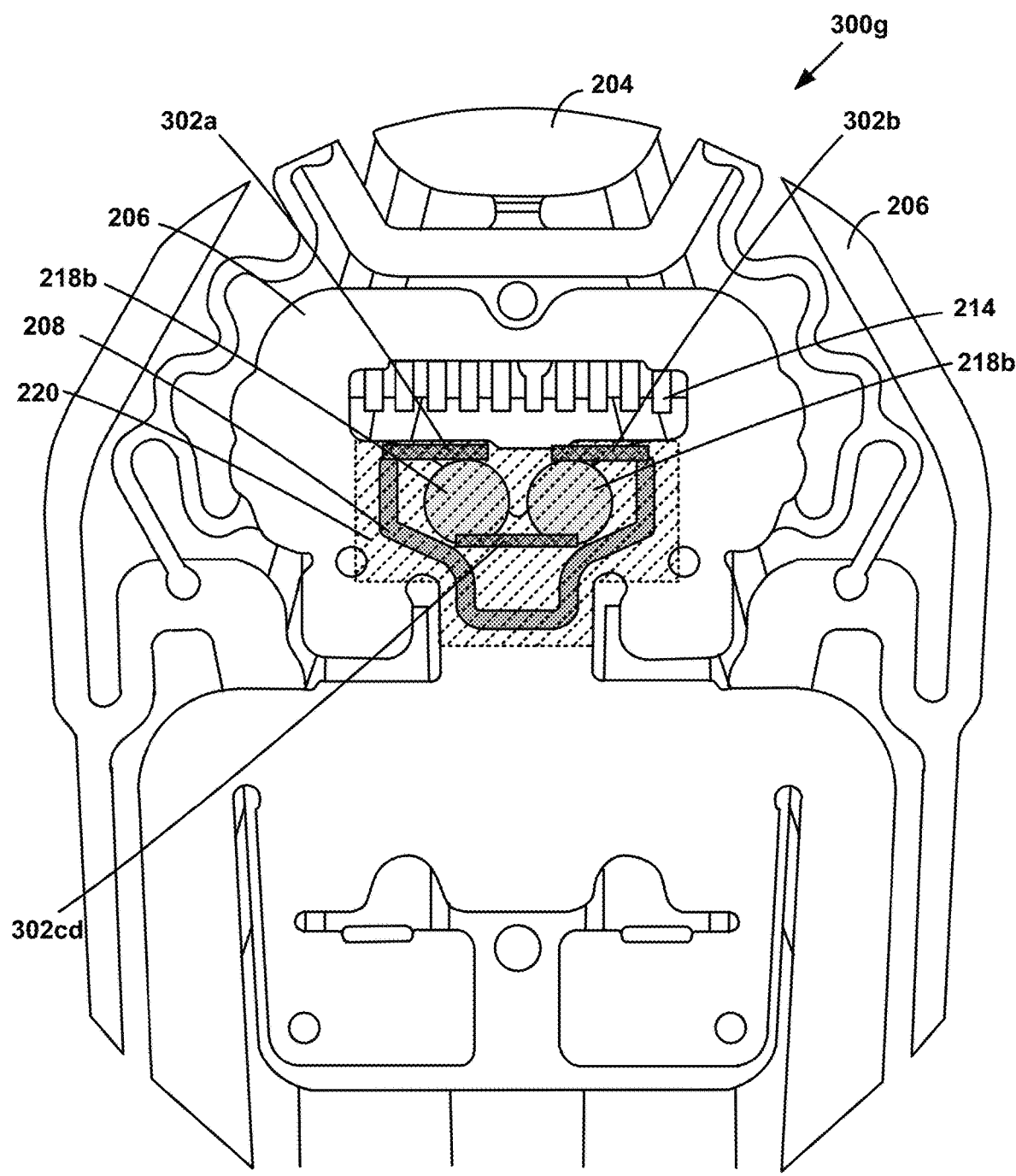

FIG. 3H depicts a top view of part of an embodiment of an HGA 300g before slider 202 is attached to suspension 204. HGA 300g is similar to HGA 300c of FIG. 3D, but includes a seventh polyimide standoff 302cd (instead of fourth polyimide standoff 302c and fifth polyimide standoff 302d). In an embodiment, seventh polyimide standoff 302cd has a thickness (height) of between about 5 µm and about 10 µm, and a width of between about 50 µm and about 70 µm, although other thicknesses and widths may be used. In an embodiment, seventh polyimide standoff 302cd has a generally rectangular shape, although other shapes may be used.

In an embodiment, seventh polyimide standoff 302cd extends between the areas occupied by fourth polyimide standoff 302c and fifth polyimide standoff 302d of FIG. 3D. In an embodiment, seventh polyimide standoff 302cd is formed as a distinct feature, independent of first polyimide standoff 208, second polyimide standoff 302a, and third polyimide standoff 302b.

Without wanting to be bound by any particular theory, it is believed that first polyimide standoff 208, second polyimide standoff 302a, third polyimide standoff 302b, and seventh polyimide standoff 302cd of FIG. 3H may confine a merged adhesive shape (e.g., a merger of adhesive dots 218a and 218b) within the boundaries of permissible adhesive spread region 220.

Figure 3I:
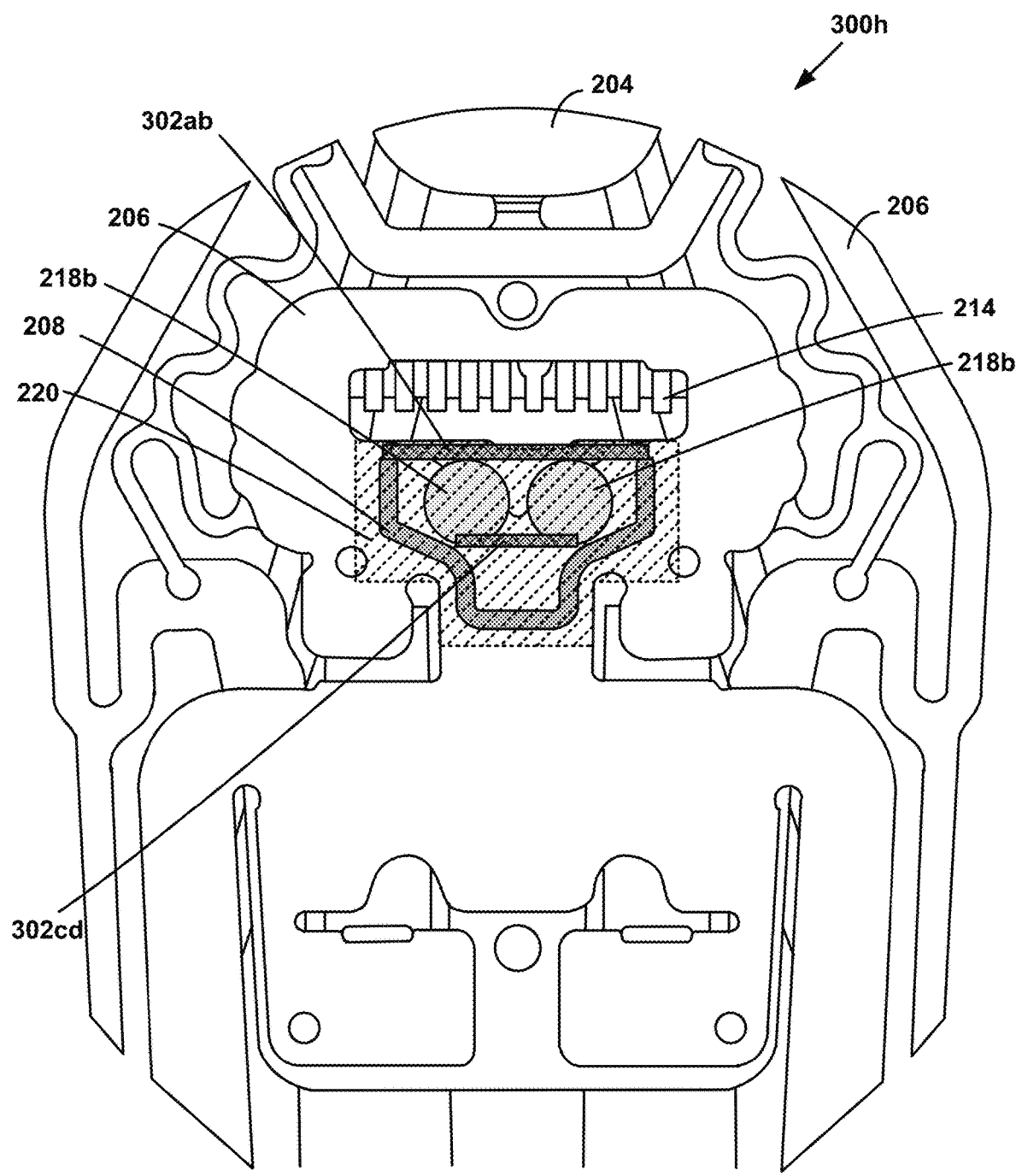

FIG. 3I depicts a top view of part of an embodiment of an HGA 300h before slider 202 is attached to suspension 204. HGA 300h is similar to HGA 300g of FIG. 3H, but includes sixth polyimide standoff 302ab (instead of second polyimide standoff 302a and third polyimide standoff 302b) that is disposed near an upper perimeter of permissible adhesive spread region 220. Without wanting to be bound by any particular theory, it is believed that first polyimide standoff 208, sixth polyimide standoff 302ab, and seventh polyimide standoff 302cd of FIG. 3I may confine a merged adhesive shape (e.g., a merger of adhesive dots 218a and 218b) within the boundaries of permissible adhesive spread region 220.

Figure 3J:
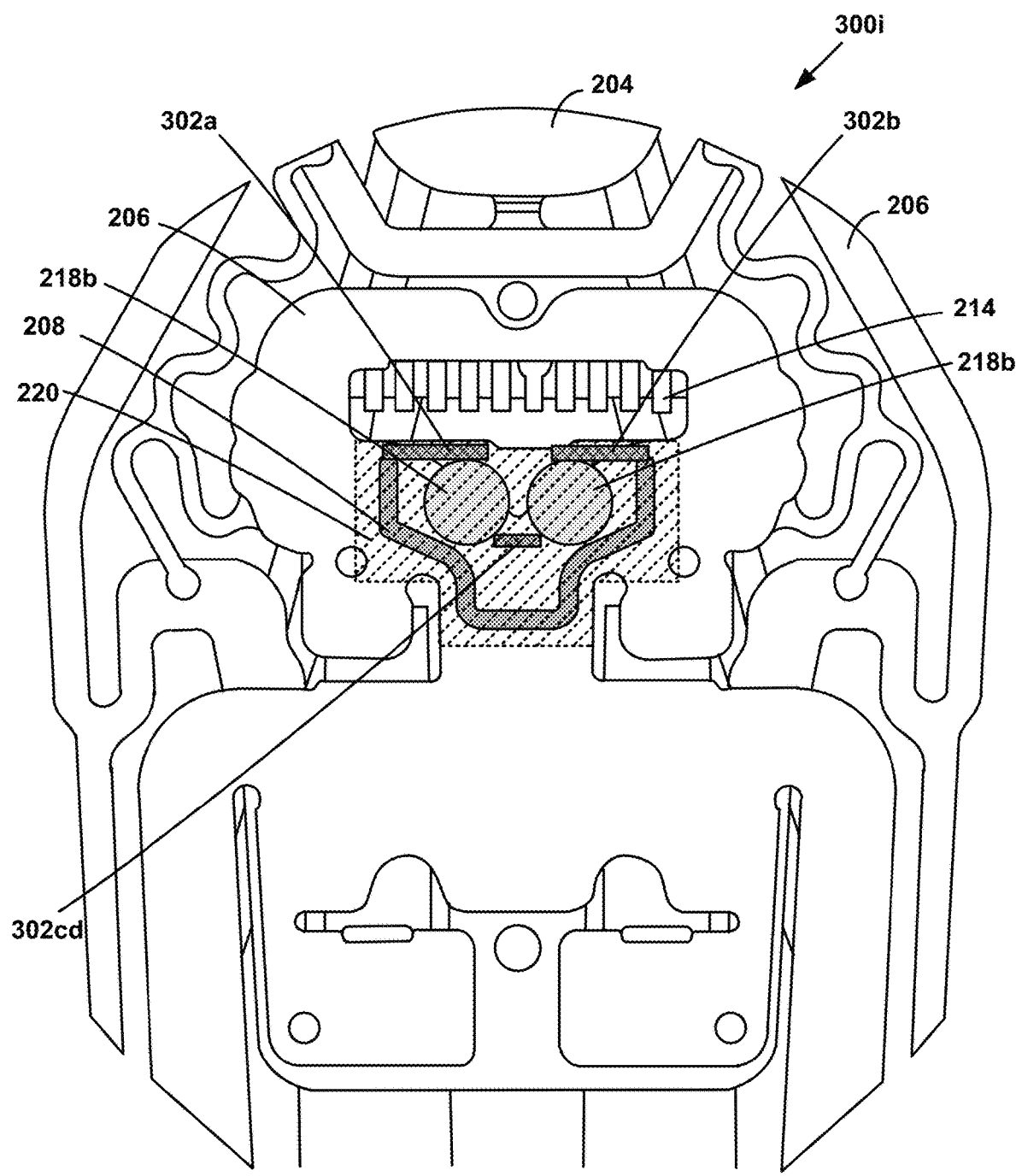

FIG. 3J depicts a top view of part of an embodiment of an HGA 300i before slider 202 is attached to suspension 204. HGA 300i is similar to HGA 300g of FIG. 3H, but includes a shorter-length seventh polyimide standoff 302cd (e.g., approximately the same length as that of fourth polyimide standoff 302c and fifth polyimide standoff 302d of FIG. 3D). Without wanting to be bound by any particular theory, it is believed that first polyimide standoff 208, second polyimide standoff 302a, third polyimide standoff 302b, and seventh polyimide standoff 302cd of FIG. 3J may confine a merged adhesive shape (e.g., a merger of adhesive dots 218a and 218b) within the boundaries of permissible adhesive spread region 220.

Figure 3K:
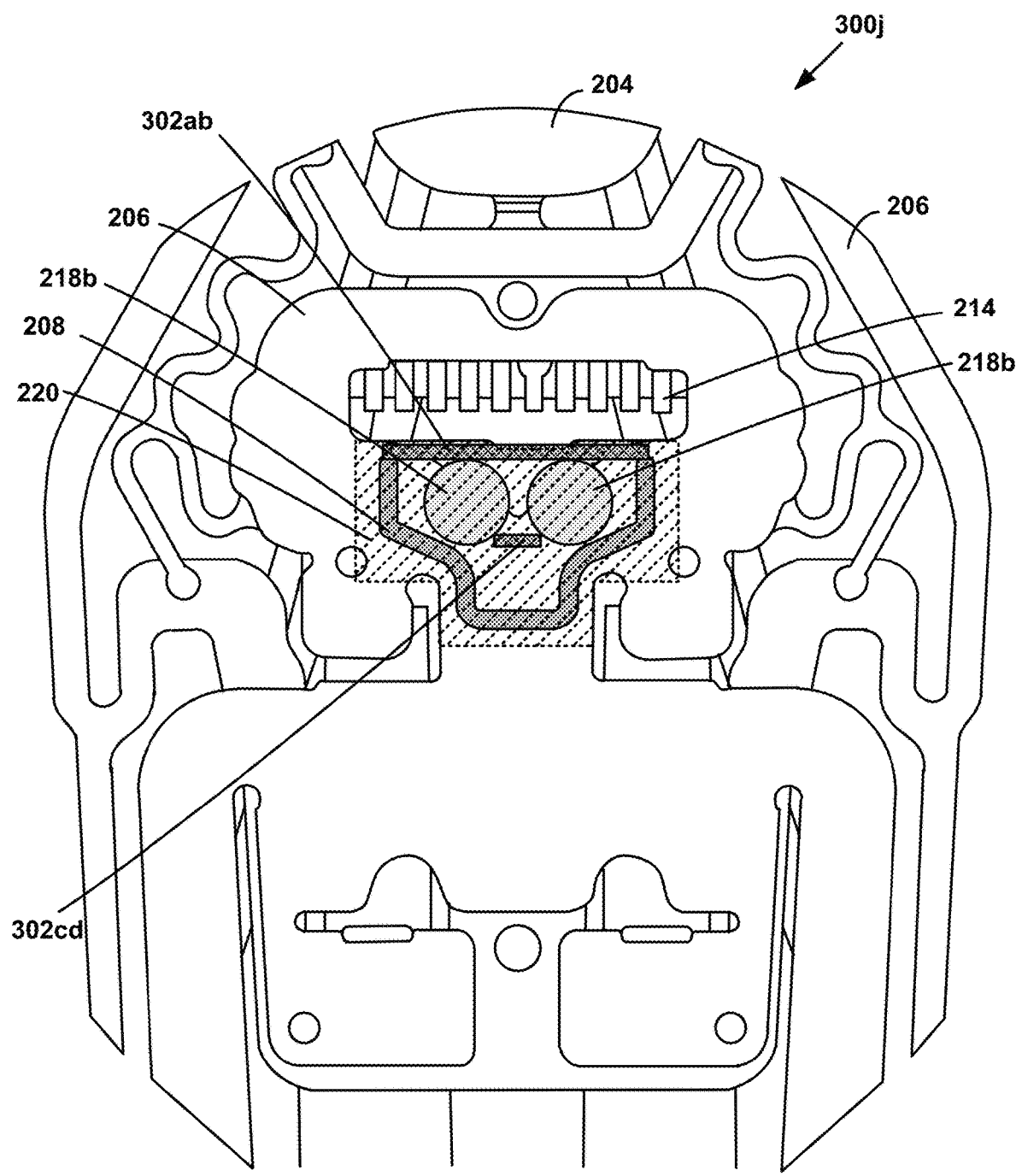

FIG. 3K depicts a top view of part of an embodiment of an HGA 300j before slider 202 is attached to suspension 204. HGA 300j is similar to HGA 300i of FIG. 3J, but includes sixth polyimide standoff 302ab (instead of second polyimide standoff 302a and third polyimide standoff 302b) that is disposed near an upper perimeter of permissible adhesive spread region 220. Without wanting to be bound by any particular theory, it is believed that first polyimide standoff 208, sixth polyimide standoff 302ab, and seventh polyimide standoff 302cd of FIG. 3K may confine a merged adhesive shape (e.g., a merger of adhesive dots 218a and 218b) within the boundaries of permissible adhesive spread region 220.

Figure 3L:
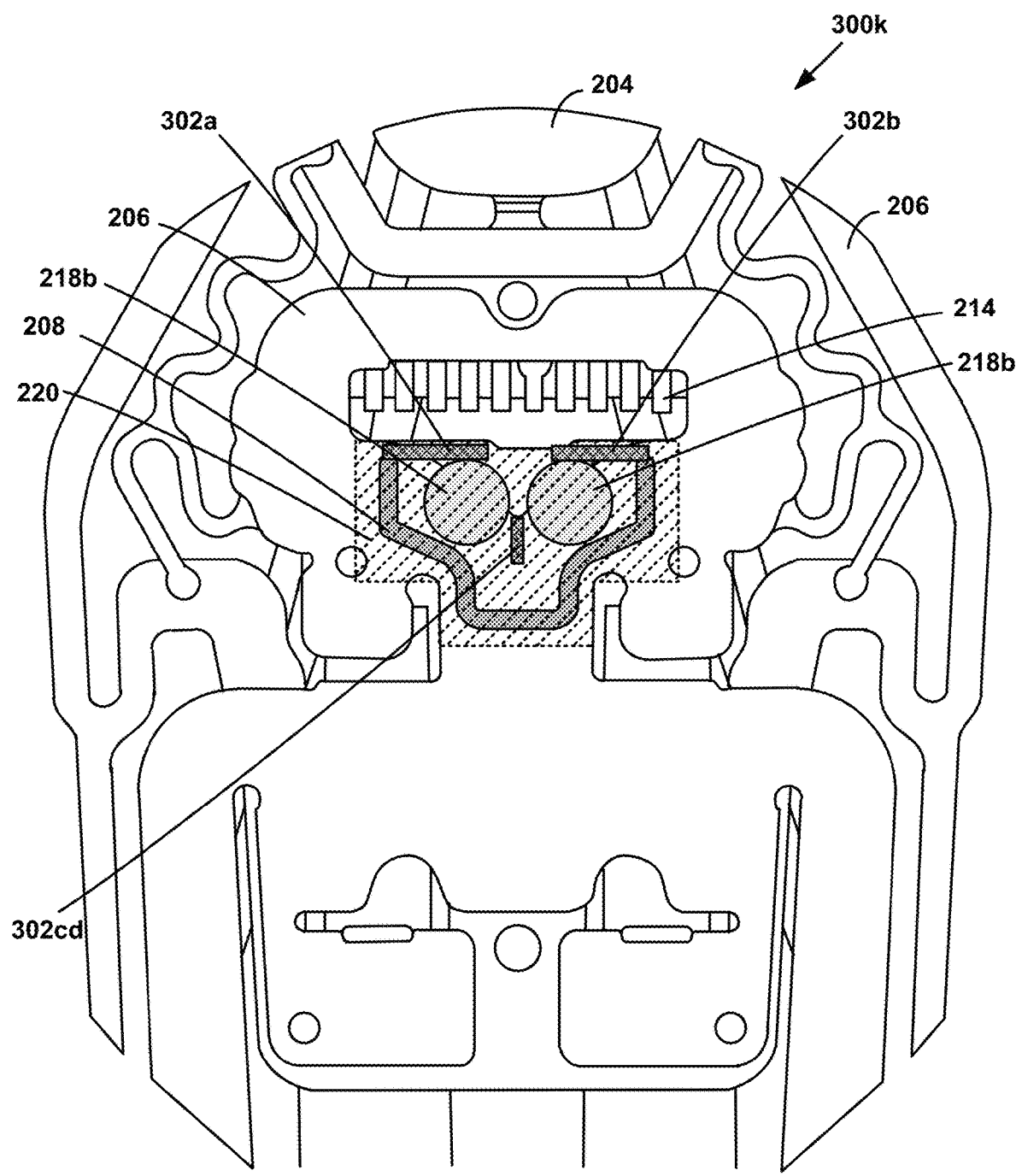

FIG. 3L depicts a top view of part of an embodiment of an HGA 300k before slider 202 is attached to suspension 204. HGA 300k is similar to HGA 300i of FIG. 3J, but seventh polyimide standoff 302cd is disposed substantially perpendicular to the orientation of second polyimide standoff 302a and third polyimide standoff 302b. Without wanting to be bound by any particular theory, it is believed that first polyimide standoff 208, second polyimide standoff 302a, third polyimide standoff 302b, and seventh polyimide standoff 302cd of FIG. 3L may confine a merged adhesive shape (e.g., a merger of adhesive dots 218a and 218b) within the boundaries of permissible adhesive spread region 220.

Figure 3M:
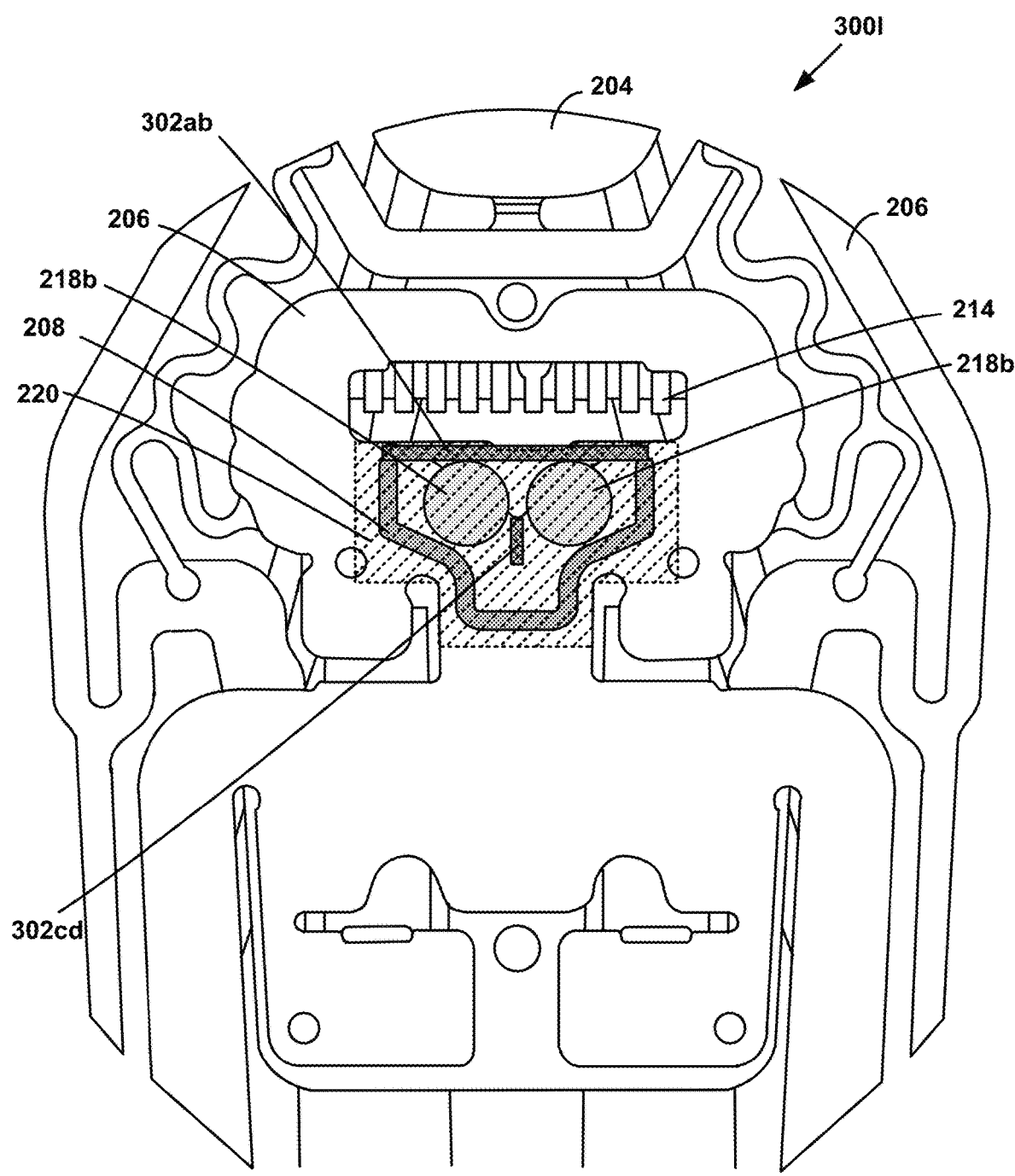

FIG. 3M depicts a top view of part of an embodiment of an HGA 300l before slider 202 is attached to suspension 204. HGA 300l is similar to HGA 300k of FIG. 3L, but includes sixth polyimide standoff 302ab (instead of second polyimide standoff 302a and third polyimide standoff 302b) that is disposed near an upper perimeter of permissible adhesive spread region 220. Without wanting to be bound by any particular theory, it is believed that first polyimide standoff 208, sixth polyimide standoff 302ab, and seventh polyimide standoff 302cd of FIG. 3M may confine a merged adhesive shape (e.g., a merger of adhesive dots 218a and 218b) within the boundaries of permissible adhesive spread region 220.x One embodiment includes a head gimbal assembly for a data storage device. The head gimbal assembly includes a suspension, and a slider mounting point on the suspension. The slider mounting point includes an adhesive pocket bounded by a plurality of dielectric standoffs.

One embodiment includes a data recording device that includes a disk having a data surface of concentric data tracks, a rotator for rotating the disk about an axis generally perpendicular to the disk, a slider maintained in operative relationship with the data surface when the disk is rotating, a suspension coupled to the slider with an adhesive, a plurality of dielectric standoffs disposed on the suspension to confine a spread of the adhesive, a transducer attached to the slider for reading data from and writing data to the data surface, an actuator for moving the slider generally radially to the disk to allow the transducer to access the data tracks, and an electronics module for processing data read from and written to the data surface.

One embodiment includes a head gimbal assembly for a data storage device. The head gimbal assembly includes a suspension, a plurality of adhesive dots on the suspension, a permissible adhesive spread region on the suspension, the permissible adhesive spread region defining outer limits in which the adhesive dots may spread without causing damage to the head gimbal assembly, a first dielectric standoff disposed on the suspension, the first dielectric standoff comprising a shape that conforms to a shape of permissible adhesive spread region, and a second dielectric standoff disposed on the suspension, the second dielectric standoff disposed in a central region of the permissible adhesive spread region.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects. For example, the terms "first" and "second" in the phrases first register and second register are used as identification labels to distinguish the register and are not meant to indicate an order or priority.

For purposes of this document, the term "set" of objects may refer to a "set" of one or more of the objects.

The foregoing detailed description has been presented for purposes of illustration and description, and is not intended to be exhaustive or to limit to the precise form disclosed. Many modifications and variations are possible in light of the above teaching. The described embodiments were chosen to best explain the principles and practical application of the disclosed technology, to thereby enable others skilled in the art to best utilize the technology in various embodiments and with various modifications as are suited to the particular use contemplated. The scope of the disclosed technology is defined by the appended claims.

The invention claimed is:

1. A head gimbal assembly for a data storage device, comprising:
a suspension; and
a slider mounting point on the suspension, the slider mounting point including an adhesive pocket, an adhesive spread region, and a plurality of dielectric standoffs comprising a first dielectric standoff, a second dielectric standoff, and a third dielectric standoff;
wherein:
the adhesive pocket is bounded by the first dielectric standoff and the second dielectric standoff;
the third dielectric standoff is disposed in the adhesive spread region between the first dielectric standoff and the second dielectric standoff;
the adhesive pocket includes a plurality of adhesive dots disposed on the suspension; and
the plurality of dielectric standoffs are configured to facilitate the plurality of adhesive dots merging to form a merged adhesive shape.

2. The head gimbal assembly of claim 1, further comprising a slider coupled to the suspension.

3. The head gimbal assembly of claim 1, wherein the plurality of dielectric standoffs are configured to limit a spread of the merged adhesive shape in the adhesive pocket.

4. The head gimbal assembly of claim 1, wherein the first dielectric standoff has a generally V-type shape, and the second dielectric standoff that has a generally rectangular shape.

5. The head gimbal assembly of claim 1, wherein the second dielectric standoff is distinct from the first dielectric standoff.

6. The head gimbal assembly of claim 1, wherein one of the plurality of dielectric standoffs is disposed near an upper perimeter of the adhesive spread region.

7. The head gimbal assembly of claim 1, wherein one of the plurality of dielectric standoffs is disposed in a central region of the adhesive spread region.

8. The head gimbal assembly of claim 1, wherein each of the plurality of dielectric standoffs have a thickness of between about 5 µm and about 10 µm.

9. The head gimbal assembly of claim 1, wherein each of the plurality of dielectric standoffs have a width of between about 50 µm and about 70 µm.

10. The head gimbal assembly of claim 1, wherein each of the plurality of dielectric standoffs comprise polyimide.

11. A data recording device comprising:
a disk comprising a data surface of concentric data tracks;
a rotator for rotating the disk about an axis generally perpendicular to the disk;
a slider maintained in operative relationship with the data surface when the disk is rotating;
a suspension coupled to the slider with a plurality of adhesive dots disposed in an adhesive pocket on the suspension, the suspension comprising an adhesive spread region;
a plurality of dielectric standoffs comprising a first dielectric standoff, a second dielectric standoff, and a third dielectric standoff disposed on the suspension, the first dielectric standoff and the second dielectric standoff bounding the adhesive pocket, the third dielectric standoff disposed in the adhesive spread region between the first dielectric standoff and the second dielectric standoff, wherein the plurality of dielectric standoffs are configured to facilitate the plurality of adhesive dots merging to form a merged adhesive shape, and are configured to confine a spread of the adhesive shape;
a transducer attached to the slider for reading data from and writing data to the data surface;
an actuator for moving the slider generally radially to the disk to allow the transducer to access the data tracks; and
an electronics module for processing data read from and written to the data surface.

12. The data recording device of claim 11, wherein the first dielectric standoff that has a generally V-type shape, and the second dielectric standoff has a generally rectangular shape.

13. The data recording device of claim 11, wherein the second dielectric standoff is distinct from the first dielectric standoff.

14. The data recording device of claim 11, wherein one of the plurality of dielectric standoffs is disposed near an upper perimeter of the adhesive spread region.

15. The data recording device of claim 11, wherein one of the plurality of dielectric standoffs is disposed in a central region of the adhesive spread region.

16. The data recording device of claim 11, wherein each of the plurality of dielectric standoffs have a thickness of between about 5 µm and about 10 µm.

17. The data recording device of claim 11, wherein each of the plurality of dielectric standoffs comprise polyimide.

18. A head gimbal assembly for a data storage device, comprising:
a suspension;
a plurality of adhesive dots on the suspension;
a permissible adhesive spread region on the suspension, the permissible adhesive spread region defining outer limits in which the adhesive dots may spread without causing damage to the head gimbal assembly;
a first dielectric standoff disposed on the suspension, the first dielectric standoff comprising a shape that conforms to a shape of permissible adhesive spread region;
a second dielectric standoff disposed on the suspension, the second dielectric standoff disposed near an upper perimeter of the permissible adhesive spread region; and
a third dielectric standoff disposed on the suspension, the third dielectric standoff disposed between the first dielectric standoff and the second dielectric standoff in a central region of the permissible adhesive spread region,
wherein the first and second dielectric standoffs are configured to facilitate the plurality of adhesive dots merging to form a merged adhesive shape.

19. The head gimbal assembly of claim 18, wherein the first dielectric standoff and the second dielectric standoff each comprise polyimide.

* * * * *